US012683910B2

(12) United States Patent
Rojas et al.

(10) Patent No.: US 12,683,910 B2
(45) Date of Patent: Jul. 14, 2026

(54) DYNAMIC RESOURCE ALLOCATION IN NETWORK DEVICE

(71) Applicant: Hewlett Packard Enterprise Development LP, Spring, TX (US)

(72) Inventors: Alonso Jose Carvajal Rojas, Heredia (CR); Rodolfo Piedra Camacho, Heredia (CR); Fernando Cortes Campos, Heredia (CR); Eduardo Badilla Ramirez, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 184 days.

(21) Appl. No.: 18/651,116

(22) Filed: Apr. 30, 2024

(65) Prior Publication Data

US 2025/0337696 A1      Oct. 30, 2025

(51) Int. Cl.
| | |
|---|---|
| *H04L 47/78* | (2022.01) |
| *H04L 47/70* | (2022.01) |
| *H04L 47/74* | (2022.01) |

(52) U.S. Cl.
CPC .......... *H04L 47/781* (2013.01); *H04L 47/745* (2013.01); *H04L 47/822* (2013.01)

(58) Field of Classification Search
CPC .... H04L 47/781; H04L 47/745; H04L 47/822
See application file for complete search history.

(56) References Cited

U.S. PATENT DOCUMENTS

| | | | | |
|---|---|---|---|---|
| 10,042,768 | B1* | 8/2018 | Karnowski | H04L 67/568 |
| 10,587,516 | B1* | 3/2020 | Arad | G06F 16/2455 |
| 2009/0282167 | A1* | 11/2009 | Dai | H04L 45/54 |
| | | | | 707/E17.014 |
| 2022/0291989 | A1* | 9/2022 | Wang | H04L 41/0631 |
| 2024/0054015 | A1* | 2/2024 | Raz | G06F 9/5022 |
| 2024/0054016 | A1* | 2/2024 | Deutsher | G06F 9/5016 |
| 2025/0328459 | A1* | 10/2025 | Hoeben | G06F 12/023 |

* cited by examiner

*Primary Examiner* — John W Miller
*Assistant Examiner* — Akshay Doshi
(74) *Attorney, Agent, or Firm* — Hewlett Packard Enterprise Patent Department

(57) ABSTRACT

A method of operating a network device includes: monitoring, by a controller of the network device, utilization of memory resources of the network device; sending, by the controller, information regarding the utilization of the memory resources to a remote server, where the remote server is connected to the network device through a network connection; receiving, by the controller, a first request from the remote server to change memory allocation for a first memory region of the memory resources, where the first memory region is used by a software feature of the network device; and in response to the first request, adjusting, by the controller, a size of the first memory region without restarting the network device.

20 Claims, 9 Drawing Sheets

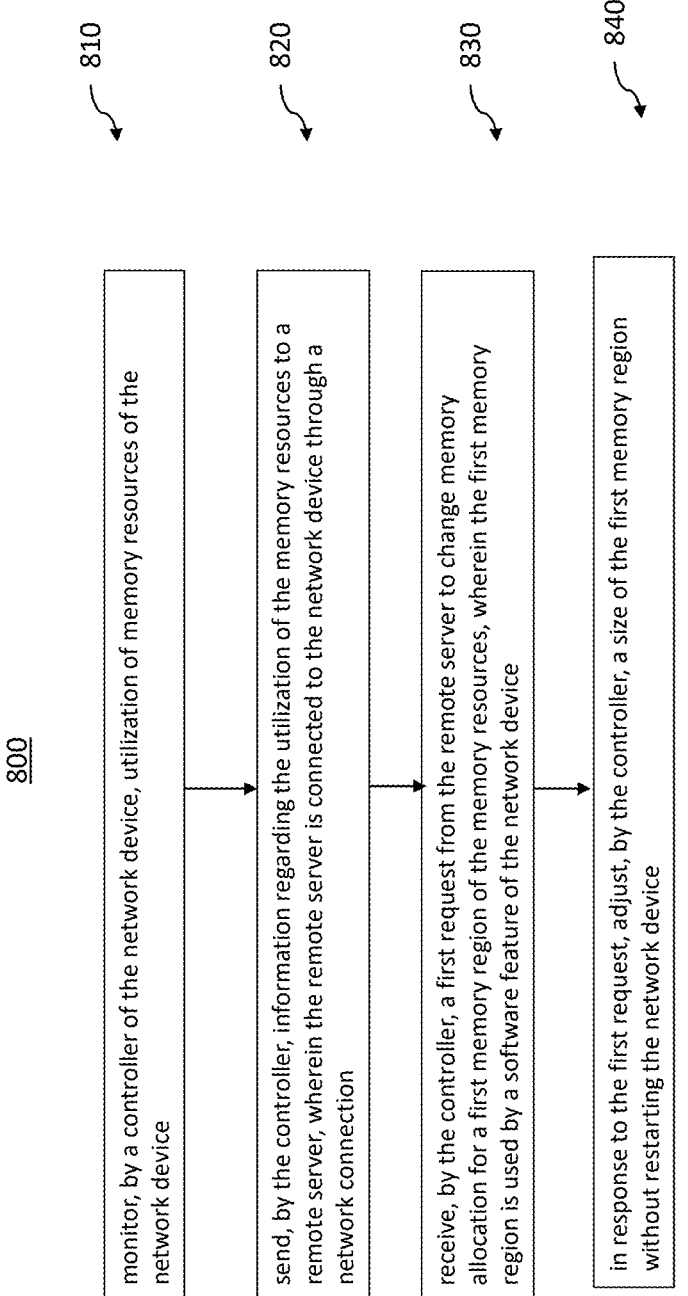

800

810 — monitor, by a controller of the network device, utilization of memory resources of the network device 820 — send, by the controller, information regarding the utilization of the memory resources to a remote server, wherein the remote server is connected to the network device through a network connection 830 — receive, by the controller, a first request from the remote server to change memory allocation for a first memory region of the memory resources, wherein the first memory region is used by a software feature of the network device 840 — in response to the first request, adjust, by the controller, a size of the first memory region without restarting the network device

Fig. 8

DYNAMIC RESOURCE ALLOCATION IN NETWORK DEVICE

BACKGROUND

An Internet Protocol (IP) network is a network that uses data packets (may also be referred to as packets) to exchange data between connected devices. Each device in the network has a unique IP address, which is a numerical label that allows it to interact with other devices. The packets contain information about the sender's IP address, the receiver's IP address, and the data content. An IP network may include multiple local networks that are interconnected with each other by network devices, such as routers, switches, or the like.

Network routing is the process of selecting a path across one or more networks. In packet-switching networks, such as the Internet, routing selects the paths for IP packets to travel from their origin to their destination. These Internet routing decisions are made by the network devices.

BRIEF DESCRIPTION OF THE DRAWINGS

Aspects of the present disclosure are best understood from the following detailed description when read with the accompanying figures.

FIG. 8 illustrates a flow chart of a method of operating a network device, according to some implementations.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

The following disclosure provides many different examples for implementing different features. Specific examples of components and arrangements are described below to simplify the present disclosure. These are, of course, merely examples and are not intended to be limiting.

Figure 1:
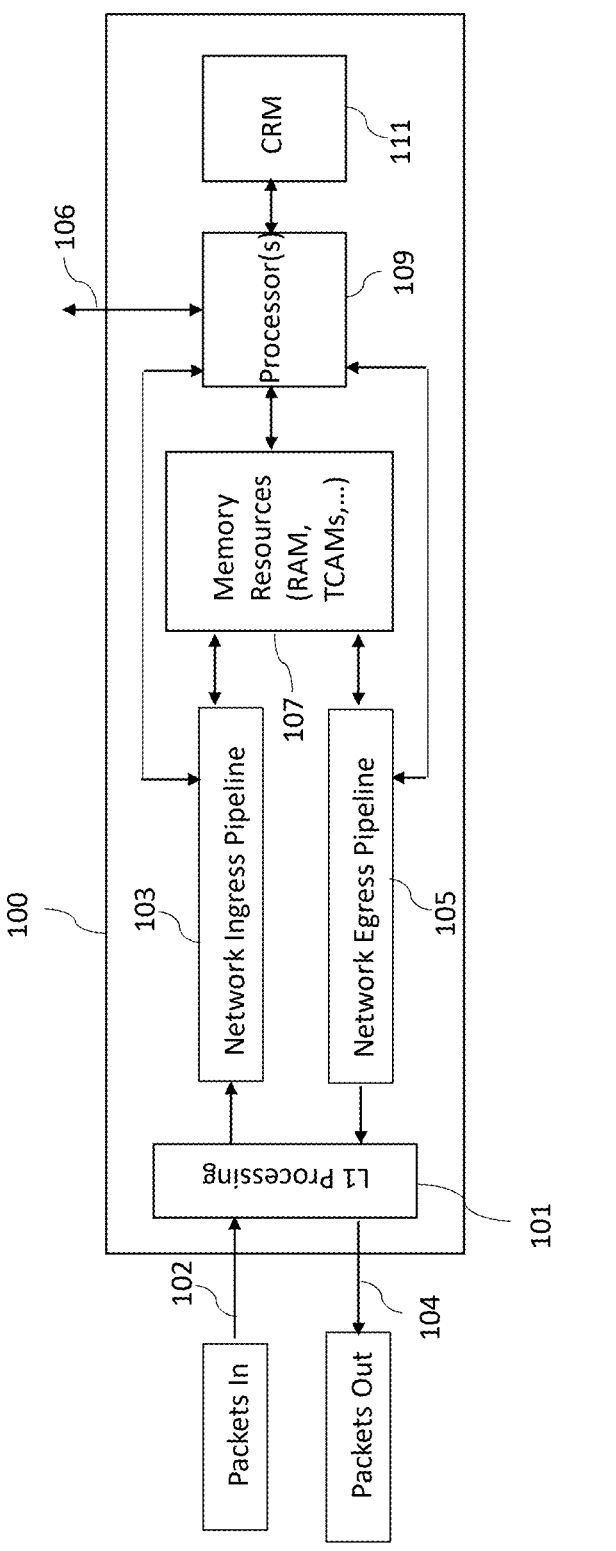
FIG. 1 illustrates a block diagram of a network device, according to some implementations.

FIG. 1 illustrates a block diagram of a network device 100, according to some implementations. The network device 100 may be, e.g., a router. Note that FIG. 1 is a high-level abstraction of some functional blocks of the network device 100, and the blocks in FIG. 1 may not have a one-to-one correspondence with the hardware blocks within the network device 100. Also, for simplicity, not all features of the network device 100 are illustrated. FIG. 1 further illustrates data packets (e.g., IP packets) received by or sent from the network device 100.

As illustrated in FIG. 1, the network device 100 (e.g., a router) has one or more input ports 102 (may also be referred to as input interfaces) for receiving data packets, and one or more output ports 104 (may also be referred to as output interfaces) for sending out (e.g., forwarding) data packets. The network device 100 has a Layer-1 (L1) processing unit 101, which interacts with the input ports 102 and output ports 104. The L1 processing unit 101 includes circuits that perform the physical layer processing such as signal conditioning (e.g., filtering, amplification, level shifting), modulation/demodulation, equalization, error correction coding/decoding, and so on. The L1 processing unit 101 performs conversion between physical signals (e.g., electrical signals such as voltage signals) at the input ports 102/output ports 104 and digital data (e.g., data packets) processed by the network device 100. Note that in the discussion herein, Layer-1 (or Layer-2 (L2), or Layer-3 (L3)) refers to the corresponding layer in the Open Systems Interconnection (OSI) seven-layer model.

The network device 100 further includes a network ingress pipeline 103, a network egress pipeline 105, and memory resources 107. The network ingress pipeline 103 includes circuits for determining the routing path for a received data packet. For example, the network ingress pipeline 103 may compare the address of the received data packet (e.g., the IP address of the data packet if the network device 100 is performing routing at L3, or the Medium Access Control (MAC) address if the network device 100 is performing routing at L2) with addresses saved in a forwarding table stored in the memory resources 107. If the address of the received data packet matches an address in the Forwarding Table, the output interface (e.g., output port) in the Forwarding Table corresponding to the matching address is used to send out (e.g., forward) the data packet to the next hop in the routing path. In some implementations, the network device 100 may be configured to route data packets at the L2 level (e.g., using MAC addresses) or L3 level (e.g., using IP addresses), and therefore, the network device 100 may function as a router or a switch, or may be programmed to switch its function between a router and a switch during operation.

The network egress pipeline 105 includes circuits for sending out the data packet to the next hop at the selected output interface. The memory resources 107 includes a plurality of memory regions, which may include memory regions of different types, such as Random-Access Memory (RAM), Ternary Content-Addressable Memory (TCAM), or the like. The memory resources 107 may be used to store various tables, such as routing tables, forwarding tables, or the like, which are used by the network device 100 for performing the routing function.

In the example of FIG. 1, the network device 100 further includes one or more processors 109 and a non-transitory computer-readable medium 111 coupled to the one or more processors 109. The one or more processors 109 may be, e.g., Central Processing Units (CPUs), micro-controllers, Digital Signal Processors (DSPs), or the like. The non-transitory computer-readable medium 111 (e.g. a non-volatile memory) stores instructions (e.g., software programs) executable by the one or more processors 109 to perform various functions of the network device 100. For example, the one or more processors 109 may monitor utilization of the memory resources 107, and send information regarding the utilization of the memory resources to a remote server that is connected to the network device 100 through a network connection. The one or more processors 109 may also receive a request from the remote server to change memory allocation for a memory region of the memory resources 107, and in response to the request, adjust the size of the memory region without restarting the network device 100. Details are discussed hereinafter.

As illustrated in FIG. 1, the one or more processors 109 are also coupled to the network ingress pipeline 103, the network egress pipeline 105, and the memory resources 107. In addition, the one or more processors 109 are coupled to a remote server through a data path 106, which may correspond to the network connection between the remote server and the one or more processors 109. The one or more processors 109 and the non-transitory computer-readable medium 111 may be integrated in a controller of the network device 100, according to some implementations.

In typical network device (e.g., router) implementations, the memory resources of the network device are statically allocated at boot time for various software features and cannot be changed at run time. For example, a 112 KB memory region may be assigned for MAC Source Address (SA)/MAC Destination Address (DA), a 16 KB memory region may be assigned for Multicast SG and Star G, and a 160 KB memory region may be assigned for Address Resolution Protocol (ARP) Host. Changing those resource assignments traditionally requires re-initializing (e.g., rebooting, re-starting) the network device, using a different resource distribution profile. Re-initializing the network device, however, incurs traffic disruption.

The memory resource usage on a network device is unique to each client. Therefore, for some network topologies, some memory resources might be totally or partially unused. The present disclosure discloses a network device which provides an automated process that is able to redistribute (e.g., reallocate) the memory resources automatically on demand. As a result, a reboot of the network device is not required, making the resource distribution generic to any customer. In addition, the memory resources of the network device do not need to be configured for specific customers at boot time, and instead, the memory resources can be dynamically allocated and reallocated during run time, according to some implementations.

Figure 2:
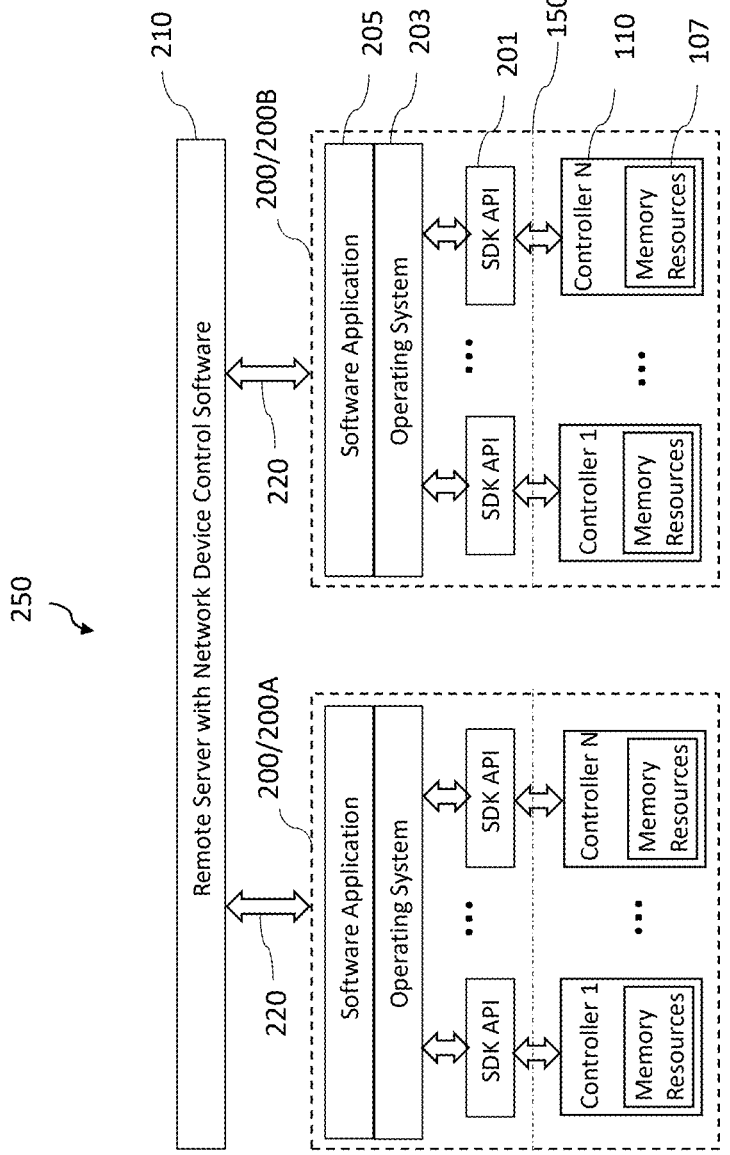
FIG. 2 illustrates a block diagram of a network system comprising a plurality of network devices and a remote server connected to the plurality of network devices, according to some implementations.

FIG. 2 illustrates a block diagram of a network system 250 comprising a plurality of network devices 200 (e.g., 200A, 200B) and a remote server 210 connected to the plurality of network devices 200 through network connections 220, according to some implementations. Each of the network devices 200 may be the same as or similar to the network device 100 in FIG. 1. Note that in FIG. 2, each network device 200 is illustrated to include one or more controllers 110 and instructions stored in the corresponding non-transitory computer-readable medium (see, e.g., 111 in FIG. 1) and executed by the one or more controllers 110. Examples of the instructions executed by the one or more controllers 110 include, e.g., firmware, operating system (OS), and software application running on the one or more controllers 110. In the illustrated example, each controller 110 has a corresponding firmware running on it. The OS and the software application are shared by all the controllers 110.

The controller 110 comprises one or more processors, where the processor may be, e.g., a Central Processing Unit (CPU), a micro-controller, a Digital Signal Processor (DSP), or the like. The controller 110 includes a non-transitory computer-readable medium that stores instructions (e.g., software programs) executable by the one or more processors of the controller 110. The controller 110 performs the routing function by executing the instructions using the one or more processors. Besides the one or more processors, the controller 110 may include additional specialized circuits designed for performing the routing function efficiently in terms of power consumption and time consumption. The controller 110 may be implemented as an Application Specific Integrated Circuit (ASIC), a Field Programmable Gate Array (FPGA), or the like, according to some implementations.

As illustrated in FIG. 2, each controller 110 also includes memory resources 107 (e.g., volatile memory regions), which are assigned to various software features of the network device 200 (may also be referred to as software feature of the controller 110). The memory resources 107 may include, or may be divided into, multiple physical memory regions of various sizes. One or more of the multiple physical memory regions may be organized into a logic memory region, and the logic memory region is assigned to a software feature of the network device 200. By removing physical memory region(s) from the logic memory region or adding physical memory region(s) to the logic memory region dynamically during run time of the network device 100, the memory allocation for the software feature is adjusted dynamically. Details are discussed hereinafter.

In FIG. 2, the dashed line 150 inside each network device 200 indicates a conceptual boundary between the hardware (e.g., the controller 110) of the network device 200 and the software programs of the network device 200 running on the hardware (e.g., controller 110). The software programs include firmware 201 running on each controller 110, an operating system (OS) 203 running on top of all of the firmware 201, and a software application 205 running on top of the OS 203. The software application 205 may be incorporated into the OS 203 as one software layer, according to some implementations. For simplicity, the discussion hereinafter assumes that the software application 205 is incorporated into the OS 203 as one software layer, with the understanding that the software application 205 may be implemented as another software layer on top of the OS 203.

The firmware 201 running on each controller 110 is a lower-level software program that interacts closely and efficiently with the hardware (e.g., the controller 110) to perform various functionalities used to support the routing function. For example, the firmware 201 may be written in low-level programming language (e.g., assembly language), and may include low-level, hardware-specific commands for efficiently accessing (e.g., writing, or reading) registers of the hardware, and/or for interacting or controlling the hardware in real-time through, e.g., interrupt services or the like. The parameters of the firmware 201 may be controlled (e.g., configured, adjusted) by the OS 203, according to some implementations. The firmware 201 may in turn adjust various aspects of the controller 110, such as the software features provided by the controller 110, and the memory allocations for the software features. The controller 110, under control of the firmware 201, performs the routing function to route data packets received by the network device 200. According to some implementations, the firmware 201 is part of a Software Development Kit (SDK) for the controller 110, which SDK provides Application Programming Interfaces (APIs) for software programs running on top of the SDK. Therefore, the firmware 201 may also be referred to as an SDK API.

According to some implementations, the firmware 201 monitors the utilization of the memory resources of each controller 110, and reports the utilization of the memory resources to the OS 203. The OS 203 relays the information regarding the utilization of the memory resources of each controller 110 to the remote server 210. For ease of discussion, the information regarding the utilization of the memory resources of each controller 110 may also be referred to as memory resources utilization information. If, based on the memory resources utilization information, the remote server 210 detects an under-utilization condition or an over-utilization condition for an assigned memory resource (e.g., a logic memory region allocated with one or more physical memory regions), the remote server 210 sends a resource update call to the OS 203 to request an adjustment (e.g., decrease or increase) to the size of the assigned memory resource. In response to the request to adjust the size of the assigned memory resource, the OS 203 relays the resource update call to the firmware 201 through the API of the firmware 201. Parameters of the resource update call indicate the direction of change (e.g., decrease or increase) as well as the size of change for the assigned memory resource. In response to the resource update call, the firmware 201 dynamically adjusts (e.g., decreases or increases) the size of the assigned memory resource. After the firmware 201 executes the resource update call, the firmware 201 send a message back to the remote server 210 through the OS 203 to indicate whether the size of the assigned memory resource was adjusted successfully. Further details are discussed hereinafter.

According to some implementations, the remote server 210 comprises one or more processors and a non-transitory computer-readable medium that stores instructions (e.g., software programs) executable by the one or more processors of the remote server 210. The remote server 210 performs various control functions for the network devices 200 connected to the remote server 210 by executing the instructions using the one or more processors. For example, a control software (also referred to as network device control software) runs on the one or more processors of the remote server 210 and controls the operation of the network devices 200 connected to the remote server 210. The control software detects the under-utilization condition or the over-utilization condition based on the memory resources utilization information, which information is monitored and reported by the firmware 201. An example is given below with reference to FIG. 6A to illustrate how the control software detects the under-utilization condition or the over-utilization condition.

Figure 6A:
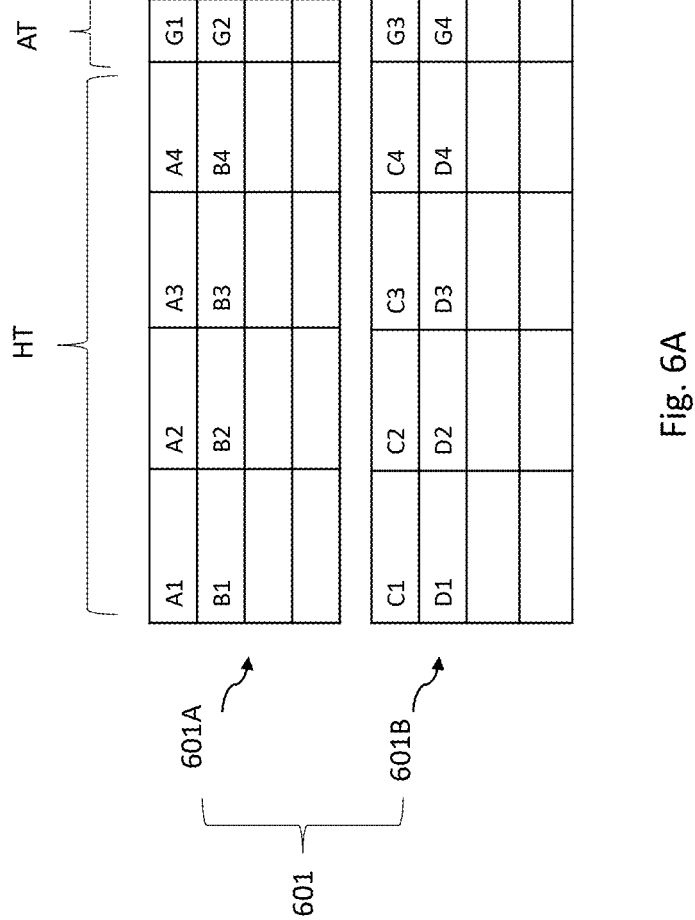
FIG. 6A illustrates a hash table and its corresponding aging table stored in a logic memory region of a network device, according to some implementations.

Referring temporarily to FIG. 6A, a logic memory region 601 includes a first physical memory region 601A and a second physical memory region 601B. For example, the first physical memory region 601A may be a 10 KB memory region and the second physical memory region 602B may be a 16 KB memory region, thereby forming the logic memory region 601 with a size of 26 KB. The logic memory region 601 may be assigned for (e.g., used by) a software feature (e.g., packet routing/switching at L2 or L3 level) of the network device 100.

As illustrated in FIG. 6A, a hash table HT and its corresponding aging table AT are stored in the logic memory region 601. In FIG. 6A, the hash table HT includes a plurality of rows, and some rows of the hash table HT have entries stored in them, while other rows of the hash table HT are un-used (e.g., are empty). In FIG. 6A, entries of the hash table HT are labeled as A1-A4, B1-B4, C1-C4, and D1-D4. The aging table AT includes some rows with stored entries labeled as G1, G2, G3, and G4, and also includes some un-used rows. The number of rows and the number of columns in the hash table HT, as well as the number of rows in the aging table AT illustrated in FIG. 6A are illustrative and non-limiting. In the example of FIG. 6A, some entries of the hash table HT and the aging table AT are stored in the first physical memory region 601A, while other entries of the hash table HT and the aging table AT are stored in the second physical memory region 601B. This is, of course, merely a non-limiting example. In other implementations, the hash table HT and the aging table AT are stored in a same physical memory region.

The hash table HT may be used for a software feature (e.g., packet routing/switching at the L2 or L3 level) of the network device 200, and may be, e.g., a routing table or a forwarding table. For example, the first entry (e.g., A1) in a row (e.g., the first row) of the hash table HT may be the hash value of the destination address (e.g., MAC address or IP address). Other entries of the hash table on the same row may store route information such as the next hop (e.g., address of the next hop in the routing path), metric (e.g., distance to destination in terms of number of hops), output interface (e.g., the interface for sending out the data packet), or the like. The corresponding aging table AT has the same number of rows as the hash table HT, with the entry in each row of the aging table AT corresponding to the same row in the hash table HT. According to some implementation, each entry of the aging table AT has a binary value. An entry of the aging table AT with a value of 0 indicates that no packet with the destination address in the corresponding row of the hash table HT has been received by the network device 200. Conversely, an entry of the aging table AT with a value of 1 indicates that at least one packet with the destination address in the corresponding row of the hash table HT has been received by the network device 200. Although not illustrated, a counter may be stored in the logic memory region 601 (or somewhere else in the memory resources), wherein the value of the counter indicates the total number of packets received by the network device 200. For ease of discussion, the logic memory region 601 in FIG. 6A is used as a non-limiting example of the logic memory region referred to in the discussion hereinafter.

In accordance with some implementations, the firmware 201 running on a controller 110 reports the memory resources utilization information to the remote server 210 through the OS 203. According to some implementations, the memory resources utilization information for a logic memory region of the controller 110 includes, e.g., some or all of the following: the total number of rows in the hash table (see, e.g., HT in FIG. 6A), the number of un-used rows in the hash table, the number of active rows in the hash table, the number of inactive rows in the hash table, and the counter value. For ease of discussion, it is assumed that the memory space used for each row of the hash table has a fixed value, and the size of the logic memory region is equal to the multiplication of the total number of rows in the hash table and the memory space used for each row. In the discussion herein, an un-used row in the hash table refers to a row that does not yet store entries of the hash table (hence not used yet). An active row of the hash table refers to a row that stores entries of the hash table and has a corresponding entry in the aging table (see, e.g., AT in FIG. 6A) with a value of 1. An inactive row of the hash table refers to a row that stores entries of the hash table and has a corresponding entry in the aging table with a value of 0.

If the counter value is larger than a pre-determined threshold, and the number of inactive rows in the hash table is not zero, this indicates that packets with destination addresses same as those stored in the inactive rows of the hash table have not arrived for a certain period of time, and therefore, the remote server 210 may determine that the entries in the inactive rows of the hash table HT may be deleted (together with the zero entries in the aging table AT) to save memory space.

According to some implementations, the number of used rows (e.g., number of rows storing entries of the hash table HT, which is equal to the sum of the number of inactive rows and the number of active rows) in the hash table HT changes over time, because the network device 200 learns routing information from neighboring network devices 200 through a dynamic routing protocol and updates its hash table HT (and the corresponding aging table AT) from time to time. The remote server 210 may monitor the rate of change in the number of used rows (which indicates the number of destination addresses stored in the hash table) in the hash table HT by tracking the change (e.g., increase or decrease) in the number of used rows in the hash table HT over a pre-determined period of time (as indicated by the change in the counter value).

If, over a pre-determined period of time, an under-utilization factor for the logic memory region 601 remains above a certain threshold (e.g., 30%), or increases above a certain threshold, then an under-utilization condition for the logic memory region 601 may be declared by the remote server 210, according to some implementations. The under-utilization factor may be computed as the number of un-used rows in the hash table divided by the total number of rows in the hash table, or may be computed as a sum of the number of un-used rows and the number of inactive rows in the hash table divided by the total number of rows in hash table. The remote server 210 may calculate an amount of memory space in the logic memory region 601 that can be released (e.g., removed) from the logic memory region 601 for use by other software features of the network device 200, and may send a request to the OS 203 to reduce the memory allocation for the logic memory region 601 by the calculated amount.

Similarly, if over a pre-determined period of time, the under-utilization factor for the logic memory region 601 remains below a certain threshold (e.g., 10%), or drops below a certain threshold, then the remote server 210 may declare an over-utilization condition for the logic memory region 601, according to some implementations. An over-utilization condition may serve as an indication that the logic memory region 601 is about to be used up by the entries of the hash table and more memory regions may need to be added (e.g., allocated) to the logic memory region 601 for storing more entries of the hash table. The remote server 210 may calculate an amount of memory space that needs to be added to the logic memory region 601 based on, e.g., the rate of decrease in the under-utilization factor and the current size of the logic memory region 601, and may send a request to the OS 203 to increase the memory allocation for the logic memory region 601 by the calculated amount. According to some implementations, the detection of the under-utilization condition and the over-utilization condition is performed by the network device control software running on the remote server 210.

Figure 3:
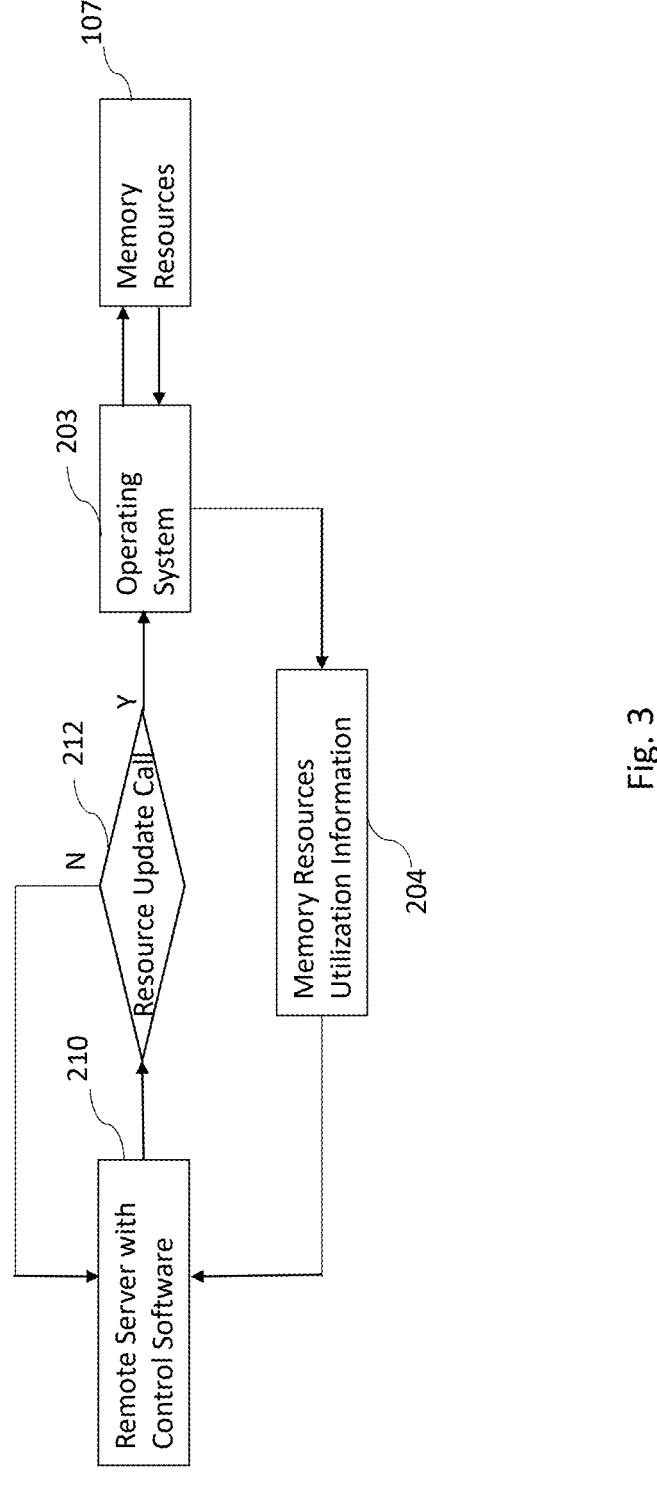
FIG. 3 illustrates interactions between the remote server and one of the plurality of network devices of FIG. 2, according to some implementations.

FIG. 3 illustrates interactions between the remote server 210 and a network device 200 connected to the remote server 210 in FIG. 2, according to some implementations. Note that for simplicity, only some components of the network device 200 (e.g., operating system 203 and memory resources 107) are illustrated in FIG. 3. As illustrated in FIG. 3, the OS 203 of the network device 200 monitors (e.g., through firmware 201) resource utilization of the memory resources 107 of a controller 110, and sends the memory resources utilization information 204 to the remote server 210. If, based on the memory resources utilization information, the remote server 210 detects an under-utilization condition or an over-utilization condition for the controller 110, the remote server 210 may send a resource update call 212 to the OS 203 to request an adjustment (e.g., increase or decrease) of the memory allocation for a logic memory region (e.g., 601) assigned to a software feature of the controller 110. The OS 203 then dynamically adjusts (e.g., through firmware 201) the memory allocation for the logic memory region without rebooting the network device 100, and sends a message to update the resource utilization information after adjusting the memory allocation. If the remote server 210 does not detect an under-utilization condition or an over-utilization condition, no resource update call is sent to the OS 203. Details regarding dynamic allocation of memory regions are discussed hereinafter.

Figure 4:
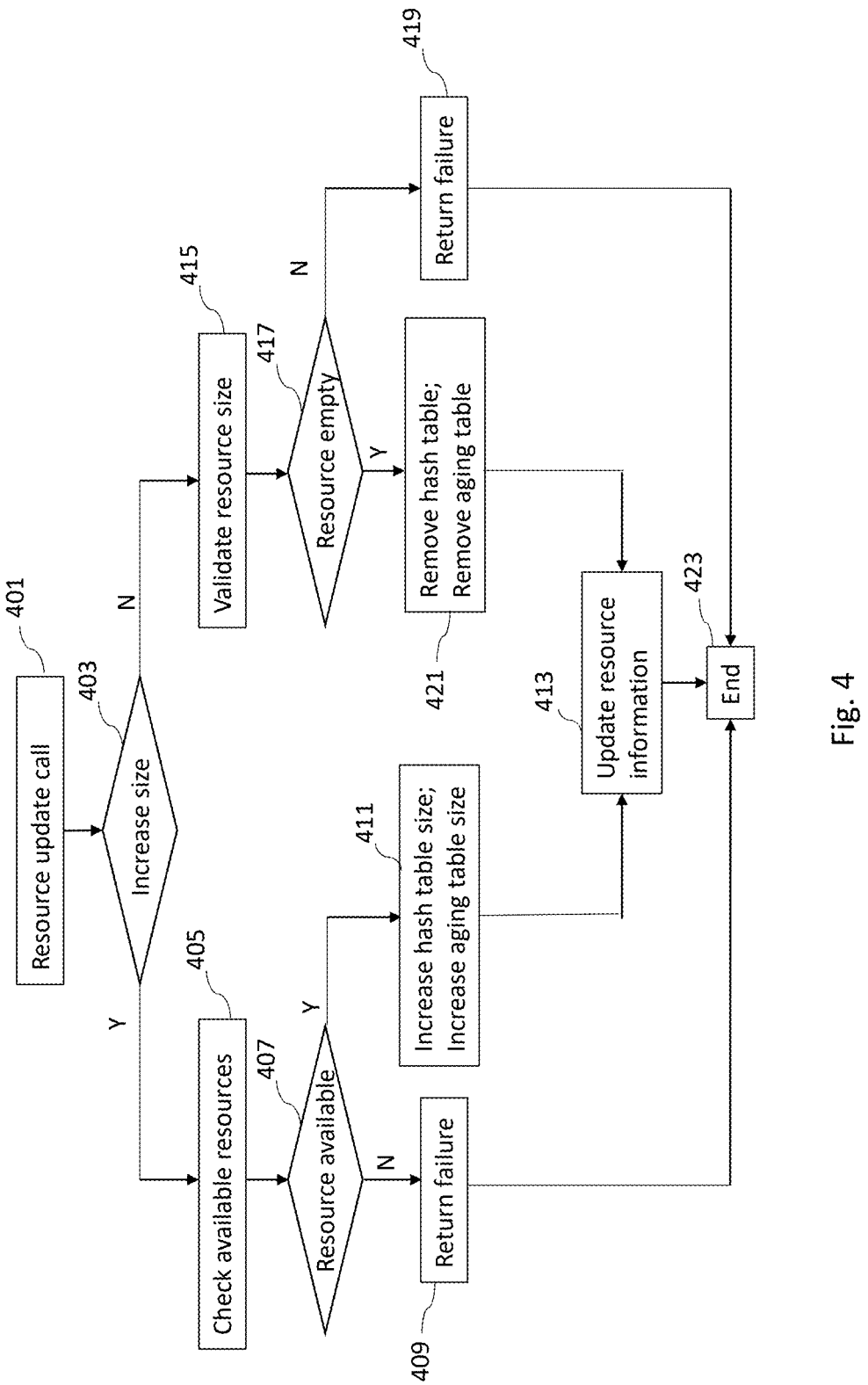
FIG. 4 illustrates a flow chart of a method of changing the memory allocation for a memory region of a network device, according to some implementations.

FIG. 4 illustrates a flow chart of a method of adjusting the memory allocation for a memory region of a network device, according to some implementations. The processing steps illustrated in FIG. 4 may be performed by the firmware 201 of a controller 110 to dynamically reallocate memory resources for a memory region (e.g., a logic memory region) of the controller 110. For ease of discussion, the logic memory region 601 in FIG. 6A is used as an example of the logic memory region in the discussion of FIG. 4.

Referring to FIG. 4, at block 401, a resource update call relayed by the OS 203, which requests a change to the size of the logic memory region 601, is received by the firmware 201. At block 403, the firmware 201 checks if the resource update call requests an increase in the logic memory region 601. If the resource update call requests an increase in the logic memory region 601, processing goes to block 405, where the firmware 201 checks the available memory resources, e.g., by checking the sizes of unallocated physical memory regions of the memory resources. Here, an unallocated physical memory region refers to a physical memory region that is not allocated (e.g., assigned) to any logic memory region. Next in block 407, the firmware 201 determines if one or more unallocated physical memory regions with a total memory size large enough to satisfy the request of the resource update call are available. For example, assume that the resource update call requests an increase in the logic memory region 601 by a given amount (e.g., 16 KB), the firmware 201 checks if one or more unallocated physical memory regions having a total memory size larger than the requested amount (e.g., 16 KB) are available in the memory resources. If the firmware 201 determines that the requested memory resource is available (e.g., there are enough unallocated physical memory regions), processing goes to block 411, where the firmware 201 adds (e.g., allocates) the one or more unallocated physical memory regions to the logic memory region 601 to increase the hash table size and the aging table size. Next, in block 413, the firmware 201 sends a message containing the updated source utilization information to the OS 203. The OS 203 relays the message to the remote server 210. If, however, the firmware 201 determines that the requested memory resource is not available (e.g., there are not enough unallocated physical memory regions), processing goes to block 409, where the firmware 201 sends an error message to the OS 203 to indicate a failure in the execution of the resource update call. The OS 203 relays the error message to the remote server 210.

If the resource update call requests a decrease in the logic memory region 601, processing goes to block 415, where the firmware 201 validates resource size by checking the size of each physical memory region (e.g., 601A, 601B) of the logic memory region 601, and checking whether each physical memory region is empty (e.g., storing no entries of the hash table and no entries of the aging table). Next, in block 417, the firmware 201 checks if there exists an empty resource satisfying the request. For example, assume that the resource update call requests a decrease in the logic memory region 601 by a given amount (e.g., 16 KB), the firmware 201 checks if there exists a physical memory region in the logic memory region 601 that has a memory size no less than the given amount and stores no entry of the hash table and no entry of the aging table. If such a physical memory region exists, processing goes to block 421, where the firmware 201 releases the physical memory region from the logic memory region 601 for use by other software features of the network device 200. Next, in block 413, the firmware 201 sends a message containing the updated source utilization information to the OS 203. The OS 203 relays the message to the remote server 210. If, however, the firmware 201 does not find a physical memory region in the logic memory region 601 that has a memory size no less than the given amount and stores no entry of the hash table and no entry of the aging table, processing goes to block 419, where the firmware 201 sends an error message to the OS 203 to indicate a failure in the execution of the resource update call. The OS 203 relays the error message to the remote server 210.

Figure 5:
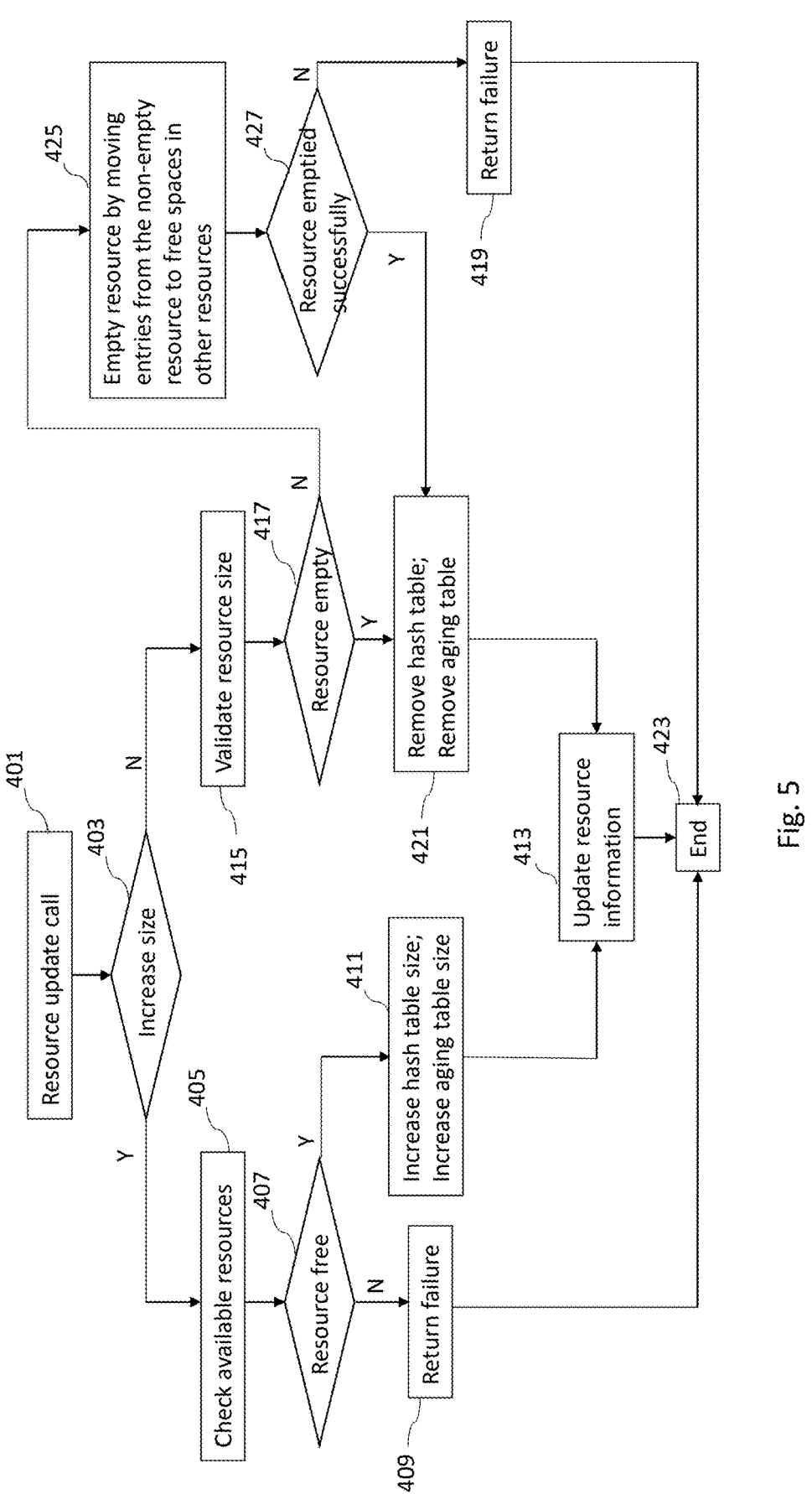
FIG. 5 illustrates a flow chart of a method of changing the memory allocation for a memory region of a network device, according to some other implementations.

FIG. 5 illustrates a flow chart of a method of changing the memory allocation for a memory region of a network device, according to some other implementations. The processing steps illustrated in FIG. 5 may be performed by the firmware 201 of a controller 110 to dynamically reallocate a memory region (e.g., a logic memory region) of the controller 110. For ease of discussion, the logic memory region 601 in FIG. 6A is used as an example of the memory region in the discussion of FIG. 5.

Figure 6B:
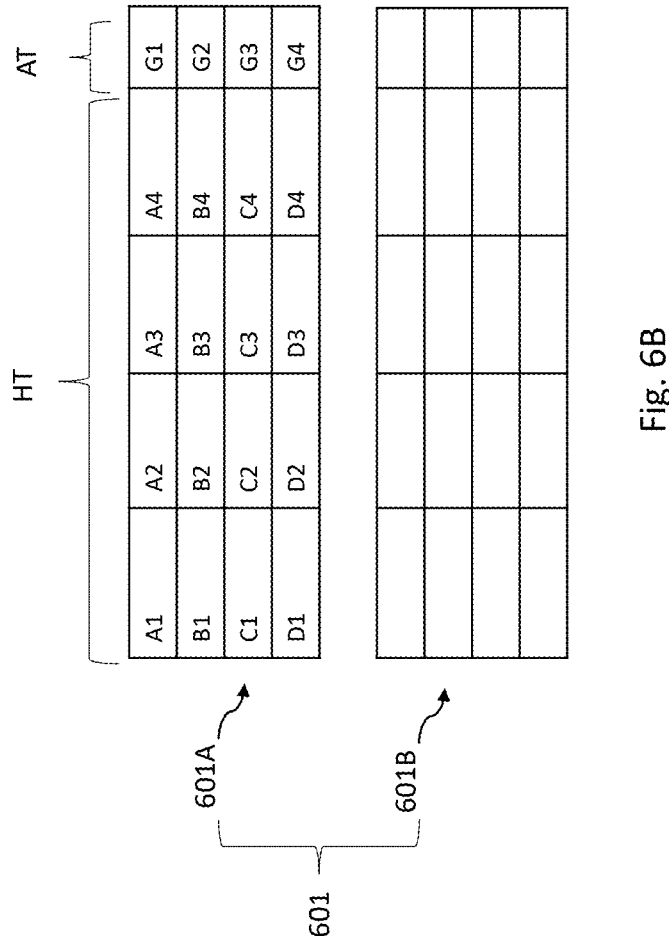
FIG. 6B illustrates the hash table and the aging table of FIG. 6A, after moving some entries of the hash table and the aging table from a second physical memory region of the logic memory region to a first physical memory region of the logic memory region, according to some implementations.

The method in FIG. 5 is similar to the method in FIG. 4, but with additional processing blocks 425 and 427 after the processing block 417. In particular, in block 417, the firmware 201 checks if there exists an empty resource satisfying the request of the resource update call. For example, assume that the resource update call requests a decrease in the logic memory region 601 by a given amount (e.g., 16 KB), the firmware 201 checks if there exists a physical memory region in the logic memory region 601 that has a memory size no less than the given amount and stores no entry of the hash table and no entry of the aging table. If the firmware 201 does not find such a physical memory region, processing goes to block 425, where the firmware 201 tries to form an empty resource satisfying the request by moving entries of the hash table and entries of the aging table from a non-empty physical memory region to free spaces in another physical memory region. FIGS. 6A and 6B are used as an example to illustrate the processing of block 425.

Referring temporarily to FIGS. 6A and 6B. In FIG. 6A, the logic memory region 601 includes the first physical memory region 601A and the second physical memory region 601B. Assume that the first physical memory region 601A and the second physical memory region 601B have a size of 10 KB and 16 KB, respectively, and the resource update call requests a decrease of 16 KB in the size of the logic memory region 601. Note that in FIG. 6A, the hash table HT has first entries (e.g., A1-A4, B1-B4) stored in the first physical memory region 601A, and has second entries (e.g., C1-C4, D1-D4) stored in the second physical memory region 601B. Similarly, the corresponding aging table AT has first entries (e.g., G1, G2) stored in the first physical memory region 601A, and has second entries (e.g., G3, G4) stored in the second physical memory region 601B. None of the first physical memory region 601A and the second physical memory region 601B is empty. To form an empty physical memory region having a size no less than the requested amount (e.g., 16 KB), the firmware 201 moves the second entries of the hash table HT and the corresponding second entries of the aging table AT from the second physical memory region 601B to free spaces in the first physical memory region 601A, as illustrated in FIG. 6B. After moving the second entries of the hash table HT and the corresponding second entries of the aging table AT, the second physical memory region 601B has a size no less than the request amount (e.g., 16 KB) and is empty (e.g., stores no entries of the hash table HT and no entries of the aging table AT). Therefore, the second physical memory region 601B could be removed from the logic memory region 601 for use by other software features.

Referring back to FIG. 5, after the processing of block 425, processing goes to block 427, where the firmware 201 checks if the resource to be removed is emptied successfully. FIG. 6B shows an example where the resource (e.g., 601B) to be removed is emptied successfully. However, if the firmware 201 does not find a physical memory region having a size no less than the requested amount, or if there is not enough free spaces in the first physical memory region 601A to store the entries of the hash table HT and entries of the aging table AT that are previously stored in the second physical memory region 601B, the second physical memory region 601B could not be emptied successfully, and therefore, could not be removed from the logic memory region 601. If the resource to be removed is emptied successfully, the processing goes to the block 421; otherwise, the processing goes to the block 419.

Compared with the method of FIG. 4, the method of FIG. 5 may provide improved performance. By moving the entries of the hash table and the entries of the aging table to free spaces in other physical memory regions, the method of FIG. 5 may have improved chance of successfully adjusting the memory allocation for the logic memory region 601. Note that entries of the hash table and the corresponding entries of the aging table are moved together to ensure proper operation of the network device.

The new capabilities provided by the network device (e.g., 100 or 200) allow memory resources within the network device to be dynamically reallocated without the need to reboot the network device (e.g., a router). Disruption of service is avoided. In addition, by reallocating an un-used portion of a logic memory region to other software features that need more memory spaces, the overall performance of the network device is improved. As an example, consider Deep Packet Inspection (DPI), which is a software feature of the network device that allows the user or service provider to analyze data packets beyond the headers to check if the content of the data packets is consistent with the type of traffic the user or service provider wants to allow, prioritize, diagnose, or filter. To support the DPI feature, IP_FLOW entries are used in hash tables. The IP_FLOW entry may contain rules for checking data packets for a particular IP address or MAC address to support security related features such as pass or drop of the data packets. The DPI feature is resource demanding, and the principal limitation for this feature is the amount of IP_FLOW entries that could be stored in the hash table. The current disclosure allows the firmware 201 to assign unused memory resources previously assigned to a hash table on demand to other hash tables. For the DPI implementation, this means that the client (e.g., a software process utilizing the DPI feature) can increment the IP_FLOW entries so long as there are resources available, thus alleviating the main limitation for the DPI feature and improving performance of the network device.

The disclosed network device has further advantages. For example, the firmware 201 performs the memory resource allocation function efficiently, which frees up the OS 203 and the network device control software on the remote server 210 to perform more high-level tasks, such as detecting under-utilization condition and over-utilization condition, or performing load balancing (see discussion below). The firmware 201 monitors utilization of the memory resources and reports the memory resources utilization information to the remote server 210, this allows the remote server 210 to have a high-level picture of the memory resource utilization of all of the controllers 110 connected to the remote server 210. Based on the memory resources utilization information from all of the controllers 110, the remote server 210 is able to make better decisions regarding allocation/reallocation of the memory resources of the controllers 110. According to some implementations, the remote server 210 performs load balancing between different network devices 200 based on the memory resources utilization information from all of the controllers 110. For example, the network devices 200A may be mostly performing a bridging function and may need more bridge entries than route entries, where the bridge entries refer to entries in a bridge table (may also be referred to as MAC table) used in an L2 protocol for redirecting packets, and route entries refer to entries in a routing table used in an L3 protocol that modifies the virtual local area network (VLAN) bit field of a packet among other things. The remote server 210 detects this condition from the memory resources utilization information, and may instruct the network device 200A to dynamically reallocate more memory resources to store more bridge entries. To compensate for the reduction of route entries in the network device 200A, the remote server 210 may instruct the network device 200B to dynamically reallocate more memory resources to store more route entries.

Figure 7:
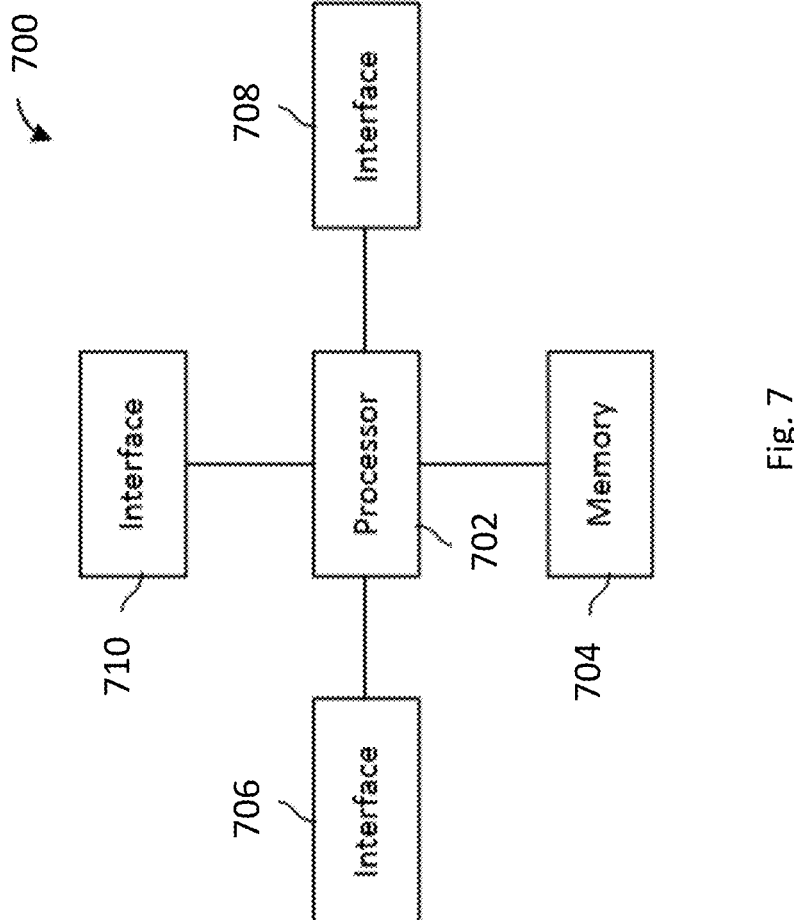
FIG. 7 illustrates a processing system for implementing at least portions of a network device, according to some implementations.

FIG. 7 illustrates a processing system 700 for implementing at least portions of a network device, according to some implementations. The processing system 700 may be used for implementing at least portions of the controller 110 in FIG. 2, or at least portions of the processor(s) 109 and the non-transitory computer-readable medium 111 in FIG. 1, as an example. In addition, the processing system 700 may also be used for implementing at least portions of the remote server 210 in FIG. 2, such as the one or more processors and the non-transitory computer-readable medium of the remote server 210.

As shown, the processing system 700 includes a processor 702, a memory 704, and interfaces 706-710, which may (or may not) be arranged as shown in FIG. 7. The processor 702 may be any component or collection of components adapted to perform computations and/or other processing related tasks, and the memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. For example, one or more of the interfaces 706, 708, 710 may be adapted to communicate data, control signal, or management messages from the processor 702 to applications installed on another device. As another example, one or more of the interfaces 706, 708, 710 may be adapted to allow a user or user device (e.g., personal computer (PC), a server, etc.) to interact/communicate with the processing system 700. The processing system 700 may include additional components not depicted in FIG. 7, such as long-term storage.

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

FIG. 8 illustrates a flow chart of a method 800 of operating a network device, according to some implementations. It should be understood that the example method shown in FIG. 8 is merely an example of many possible embodiment methods. One of ordinary skill in the art would recognize many variations, alternatives, and modifications. For example, various steps as illustrated in FIG. 8 may be added, removed, replaced, rearranged, or repeated.

Referring to FIG. 8, at block 810, a controller of the network device monitors utilization of memory resources of the network device. For example, the firmware of each controller 110 in FIG. 2 monitors the utilization of memory resources 107. At block 820, the controller sends information regarding the utilization of the memory resources to a remote server, wherein the remote server is connected to the network device through a network connection. For example, in FIG. 2, the controller 110 reports (e.g., through the OS 203) the memory resources utilization information to the remote server 210 through the network connection 220. At block 830, the controller receives a first request from the remote server to change memory allocation for a first memory region of the memory resources, wherein the first memory region is used by a software feature of the network device. For example, in FIGS. 2 and 3, when the remote server 210 detects an over-utilization or under-utilization condition for a memory region (e.g., a logic memory region) of the memory resources 107, the remove server 210 sends a resource update call 212 to the controller 110. The controller 110 receives (e.g., through the OS 203) the request (e.g., the resource update call 212) from the remote server 210 to adjust the memory allocation for the memory region. At block 840, in response to the first request, the controller adjusts a size of the first memory region without restarting the network device. For example, in response to the request to adjust the memory allocation for the memory region, the controller 110 performs operations such as those illustrated in FIG. 4 or FIG. 5 to dynamically adjust the memory allocation without restarting the network device.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method of operating a network device, the method comprising:

monitoring, by a controller of the network device, utilization of memory resources of the network device;

storing, by the controller, a hash table in a first memory region of the memory resources, wherein the first memory region is a logic memory region that includes one or more physical memory regions of the memory resources, wherein entries of the hash table are stored in at least one of the one or more physical memory regions;

sending, by the controller, information regarding the utilization of the memory resources to a remote server, wherein the remote server is connected to the network device through a network connection;

receiving, by the controller, a first request from the remote server to reduce a size of the first memory region by a first amount; and in response to the first request, adjusting, by the controller, the size of the first memory region without restarting the network device, wherein the controller is configured to, in response to the first request, reduce the size of the first memory region by:

determining sizes of the one or more physical memory regions and numbers of the entries of the hash table stored in the one or more physical memory regions; and in response to determining that a physical memory region of the first memory region has a memory size no less than the first amount and stores no entry of the hash table, releasing the physical memory region from the first memory region.

2. The method of claim 1, wherein the network device is a router or a switch, wherein the controller comprises a processor.

3. The method of claim 1, wherein the controller is further configured to, in response to the first request, reduce the size of the first memory region by:

after releasing the physical memory region, sending, by the controller, a message to the remote server to update the information regarding the utilization of the memory resources.

4. The method of claim 1, wherein the controller is further configured to, in response to the first request, reduce the size of the first memory region by:

in response to determining that the sizes of the one or more physical memory regions are smaller than the first amount, or that the entries of the hash table are stored in all of the one or more physical memory regions, reporting, by the controller, a failure of reducing the size of the first memory region by sending a message to the remote server.

5. The method of claim 1, wherein the first memory region includes a first physical memory region and a second physical memory region, wherein the entries of the hash table include first entries stored in a first portion of the first physical memory region, and include second entries stored in a second portion of the second physical memory region, wherein the method further comprises:

receiving, by the controller, a second request from the remote server to reduce the size of the first memory region; and in response to the second request, reducing, by the controller, the size of the first memory region without restarting the network device, wherein the controller is configured to, in response to the second request, reduce the size of the first memory region by:

moving the second entries of the hash table from the second physical memory region to the first physical memory region; and after moving the second entries of the hash table, releasing the second physical memory region from the first memory region.

6. The method of claim 5, wherein the controller is further configured to, in response to the second request, reduce the size of the first memory region by:

after releasing the second physical memory region, sending, by the controller, a message to the remote server to update the information regarding the utilization of the memory resources.

7. The method of claim 5, wherein the method further comprises:

storing an aging table corresponding to the hash table in the first memory region, wherein entries of the aging table include first entries stored in the first portion of the first physical memory region, and include second entries stored in the second portion of the second physical memory region, wherein the controller is configured to, in response to the second request, reduce the size of the first memory region by:

moving the second entries of the hash table and corresponding second entries of the aging table from the second physical memory region to the first physical memory region; and after moving the second entries of the hash table and the corresponding second entries of the aging table, releasing the second physical memory region from the first memory region.

8. The method of claim 1, wherein the method further comprises:

receiving, by the controller, a second request from the remote server to increase the size of the first memory region by a second amount; and in response to the second request, increasing, by the controller, the size of the first memory region without restarting the network device, wherein the controller is configured to, in response to the second request, increase the size of the first memory region by:

determining whether one or more unallocated physical memory regions of the memory resources having a total memory size no less than the second amount are available;

in response to determining that the one or more unallocated physical memory regions are available, allocating the one or more unallocated physical memory regions to the first memory region; and updating the information regarding the utilization of the memory resources by sending a message to the remote server.

9. The method of claim 8, wherein the controller is further configured to, in response to the second request, increase the size of the first memory region by:

in response to determining that the one or more unallocated physical memory regions are not available, reporting a failure of increasing the size of the first memory region by sending another message to the remote server.

10. The method of claim 1, wherein the first memory region is used by a software feature of the network device.

11. The method of claim 10, further comprising, performing, by the controller, a routing function for the software feature using the hash table.

12. A method of operating a network device, the method comprising:

assigning, by a controller of the network device, a first memory region of memory resources of the network device to a first software feature of the network device, wherein a hash table comprising a plurality of entries is configured to be stored in the first memory region, wherein the first memory region is a logic memory region that includes one or more physical memory regions of the memory resources, wherein the entries of the hash table are configured to be stored in various portions of the one or more physical memory regions;

receiving, by the controller, a first request from a server to reduce a size of the first memory region by a first amount, wherein the server is connected to the network device through a network connection; and in response to the first request, reducing, by the controller, the size of the first memory region while the network device stays powered on, wherein the controller is configured to, in response to the first request, reduce the size of the first memory region by:

determining sizes of the one or more physical memory regions and determining numbers of the entries of the hash table stored in the one or more physical memory regions; and in response to determining that a physical memory region of the first memory region has a memory size no less than the first amount and stores no entry of the hash table, releasing the physical memory region from the first memory region for use by other software features.

13. The method of claim 12, wherein the first memory region includes a first physical memory region and a second physical memory region of the memory resources, wherein the entries of the hash table include first entries stored in a first portion of the first physical memory region, and include second entries stored in a second portion of the second physical memory region, wherein the method further comprises:

receiving, by the controller, a second request from the server to reduce the size of the first memory region; and in response to the second request, reducing, by the controller, the size of the first memory region while the network device stays powered on, wherein the controller is configured to, in response to the second request, reduce the size of the first memory region by:

moving the second entries of the hash table from the second physical memory region to the first physical memory region; and after moving the second entries of the hash table, releasing the second physical memory region from the first memory region for use by the other software features.

14. The method of claim 12, wherein the method further comprises:

receiving, by the controller, a second request to increase the size of the first memory region by a second amount; and in response to the second request, increasing, by the controller, the size of the first memory region while the network device stays powered on, wherein the controller is configured to, in response to the second request, increase the size of the first memory region by:

determining whether one or more unallocated physical memory regions having a total memory size no less than the second amount are available in the memory resources; and in response to determining that the one or more unallocated physical memory regions are available, allocating the one or more unallocated physical memory regions to the first memory region.

15. The method of claim 12, wherein the first software feature of the network device uses the hash table for performing functions used for routing data packets.

16. A network device comprising:

a controller comprising one or more processors;

memory resources comprising a plurality of memory regions; and a non-transitory computer-readable medium comprising instructions executable by the one or more processors to:

monitor utilization of the memory resources;

send information regarding the utilization of the memory resources to a remote server, wherein the remote server is connected to the network device through a network connection;

receive a first request from the remote server to reduce a size of a first memory region of the memory resources by a first amount, wherein the first memory region is configured to store a hash table, wherein the hash table comprises a plurality of entries, wherein the first memory region is a logic memory region that includes one or more physical memory regions of the memory resources, wherein the entries of the hash table are configured to be stored in various portions of the one or more physical memory regions; and in response to the first request, reduce the size of the first memory region without restarting the network device, comprising:

determining sizes of the one or more physical memory regions and determining numbers of the entries of the hash table stored in the one or more physical memory regions; and in response to determining that a physical memory region of the first memory region has a memory size no less than the first amount and stores no entry of the hash table, releasing the physical memory region from the first memory region.

17. The network device of claim 16, wherein the first memory region includes a first physical memory region and a second physical memory region of the memory resources, wherein the entries of the hash table include first entries stored in a first portion of the first physical memory region, and include second entries stored in a second portion of the second physical memory region, wherein the non-transitory computer-readable medium further comprises instructions executable by the one or more processors to:

receive a second request from the remote server to reduce the size of the first memory region; and in response to the second request, reduce the size of the first memory region while the network device stays powered on, comprising:

moving the second entries of the hash table from the second physical memory region to the first physical memory region; and after moving the second entries of the hash table, releasing the second physical memory region from the first memory region for use by the other software features of the network device.

18. The network device of claim 16, wherein the first memory region is used by a software feature of the network device.

19. The network device of claim 18, wherein the controller is configured to perform a routing function using the hash table.

20. A system comprising:

the network device of claim 16; and the remote server, wherein the remote server is configured to:

detect an under-utilization condition for the first memory region based on the information regarding the utilization of the memory resources; and in response to detecting the under-utilization condition, send the first request to the network device to reduce the size of the first memory region.

\* \* \* \* \*